United States Patent
Brown et al.

(10) Patent No.: US 10,146,653 B2
(45) Date of Patent: Dec. 4, 2018

(54) AUTOMATED SYSTEM-LEVEL FAILURE AND RECOVERY

(71) Applicant: Dell Products, L.P., Round Rock, TX (US)

(72) Inventors: Michael Emery Brown, Austin, TX (US); Lee E. Ballard, Georgetown, TX (US); Stephen M. Cohoon, Austin, TX (US); Santosh Kumar Bidaralli, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 93 days.

(21) Appl. No.: 15/271,261

(22) Filed: Sep. 21, 2016

(65) Prior Publication Data

US 2018/0081776 A1    Mar. 22, 2018

(51) Int. Cl.
*G06F 11/26*      (2006.01)
*G06F 11/22*      (2006.01)
*G06F 11/263*     (2006.01)

(52) U.S. Cl.
CPC ........ *G06F 11/261* (2013.01); *G06F 11/2242* (2013.01); *G06F 11/263* (2013.01)

(58) Field of Classification Search
CPC ............. G06F 11/3688; G06F 11/3684; G06F 11/3672; G06F 11/263; G06F 11/2215; G06F 11/1479; G06F 11/2252
See application file for complete search history.

(56) References Cited

U.S. PATENT DOCUMENTS

| | | | |
|---|---|---|---|
| 5,671,352 A * | 9/1997 | Subrahmaniam et al. ................... 395/183.17 |
| 6,728,668 B1 * | 4/2004 | Kitamora et al. ............... 703/22 |
| 6,971,048 B1 * | 11/2005 | Hanson et al. ................. 714/41 |
| 8,448,027 B2 * | 5/2013 | Elnozahy et al. .............. 714/41 |
| 9,032,266 B2 * | 5/2015 | Chan ................... G06F 17/5022 |
| 9,218,254 B2 * | 12/2015 | Locasto et al. ..... G06F 11/1469 |

* cited by examiner

*Primary Examiner* — Nadeem Iqbal
(74) *Attorney, Agent, or Firm* — Fogarty LLP

(57) ABSTRACT

Systems and methods for automated system-level failure and recovery are described. In some embodiments, an Information Handling System (IHS) includes a processor and a memory, the memory having program instructions stored thereon that, upon execution by the processor, cause the IHS to execute a selected process configured to participate in an inter-process communication (IPC) with at least one other process, invoke an error handling process by simulating a fault in the IPC, and determine if the error handling process successfully handles the fault.

20 Claims, 5 Drawing Sheets

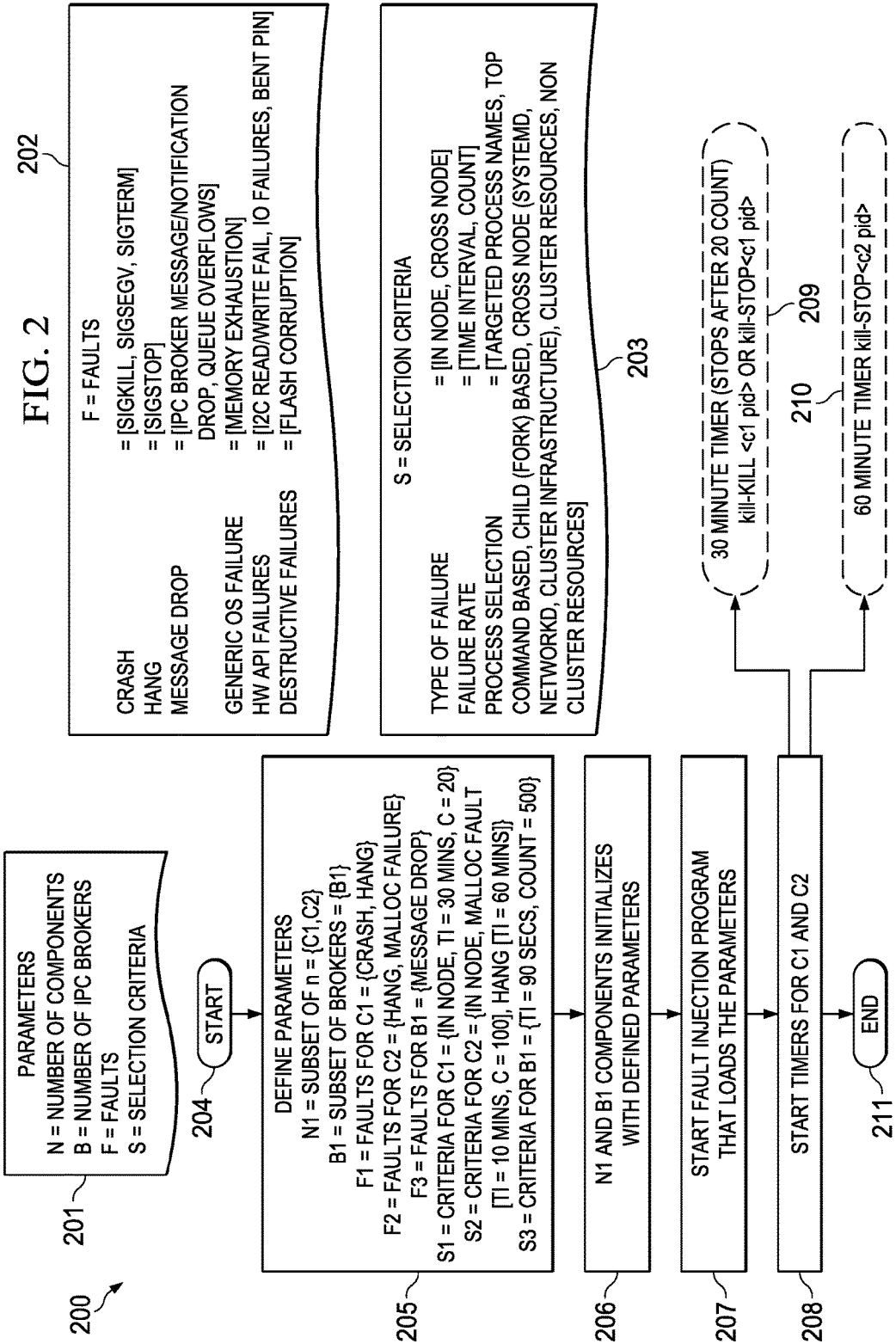

AUTOMATED SYSTEM-LEVEL FAILURE AND RECOVERY

FIELD

This disclosure relates generally to Information Handling Systems (IHSs), and more specifically, to automated system-level failure and recovery.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Generally speaking, an IHS performs operations by executing software code. Software is written by a developer and often includes a portion dedicated to handling error cases that occur during execution. In that regard, the inventors hereof have determined that, in most software products, the portion of the code that handles errors is itself the least tested.

When error paths are not rigorously tested (or not at all), it creates uncertainty for customers and a stream of field issues. Moreover, increasing product complexity means that software applications have also become more complex. For example, what used to be one running process that controlled most hardware functionality has now exploded into many independent processes, each communicating with each other over various Inter Process Communication (IPC) channels.

The inventors have recognized many error paths need to be tested for, and recovered from, in environments that involve a number of independent processes. These include, for example: testing recovery when one process of a group of process hangs or crashes, determining what happens if an IPC channel drops or delays messages, determining how the embedded application handle Operating System (OS) errors (e.g., running out of memory or persistent storage), etc. Accordingly, the inventors have identified a need for systems and methods to provide automated system-level failure and recovery that ensure, among other things, that any configurable selected set of failure conditions is tested.

SUMMARY

Embodiments of systems and methods for automated system-level failure and recovery are described herein. In an illustrative, non-limiting embodiment, an Information Handling System (IHS) may include a processor and a memory coupled to the processor, the memory having program instructions stored thereon that, upon execution by the processor, cause the IHS to: execute a selected process configured to participate in an inter-process communication (IPC) with at least one other process, invoke an error handling process by simulating a fault in the IPC, and determine if the error handling process successfully handles the fault.

In some cases, the selected process may include an IPC broker. The program instructions may further cause the IHS to determine that the error handling procedure successfully handles the fault in response to the selected process continuing to run despite the fault. For example, the inter-process communication may include an external network test. The external network test may involve testing Hypertext Transfer Protocol (HTTP) responses.

The program instructions may further cause the IHS to determine that the error handling procedure successfully handles the fault in response to the selected process failing with a known error code. Additionally or alternatively, the program instructions may cause the IHS to determine that the error handling procedure successfully handles the fault in response to the selected process recovering within a specified time period.

Moreover, the program instructions may further cause the IHS to receive configuration parameters and test inter-process dependencies using the configuration parameters. The configuration parameters may be selected from the group consisting of: an identification of an IPC broker, an identification of one or more other processes configured to communicate with the IPC broker, a list of one or more faults, and selection criteria. Also, the one or more faults may include: a crash, a hang, a malloc failure, a message drop, or an out-of-order message. Conversely, the selection criteria may include a first criterion indicating how often a particular fault is to be simulated and a second criterion indicating for how long the particular fault is to be simulated.

In another illustrative, non-limiting embodiment, a memory device may have program instructions stored thereon that, upon execution by a processor of an IHS, cause the IHS to execute a broker process configured to participate in an inter-process communication (IPC) with at least one other component; invoke an error handling process by simulating an IPC fault; and determine if the error handling process successfully handles the fault. The program instructions may further cause the IHS to determine that the error handling procedure successfully handles the fault in response to the selected process: (a) continuing to run despite the fault; or (b) failing with a known error code and recovering within a specified time period.

The program instructions may further cause the IHS to receive configuration parameters; and test inter-process dependencies using the configuration parameters. The configuration parameters may be selected from the group consisting of: an identification of an IPC broker, an identification of one or more other processes configured to communicate with the IPC broker, a list of one or more faults, and selection criteria. The one or more faults may include: a crash, a hang, a malloc failure, a message drop, or an out-of-order message, and/or the selection criteria may include: a first criterion indicating how often a particular fault is to be simulated and a second criterion indicating for how long the particular fault is to be simulated.

In yet another illustrative, non-limiting embodiment, in an IHS, a method may include executing a broker process configured to participate in an inter-process communication (IPC) with at least one other component; invoking an error handling process by simulating an IPC fault; and determining if the error handling process successfully handles the fault.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 2 is a flowchart of an example of a method for automated system-level failure and recovery according to various embodiments.

DETAILED DESCRIPTION

Figure 1:
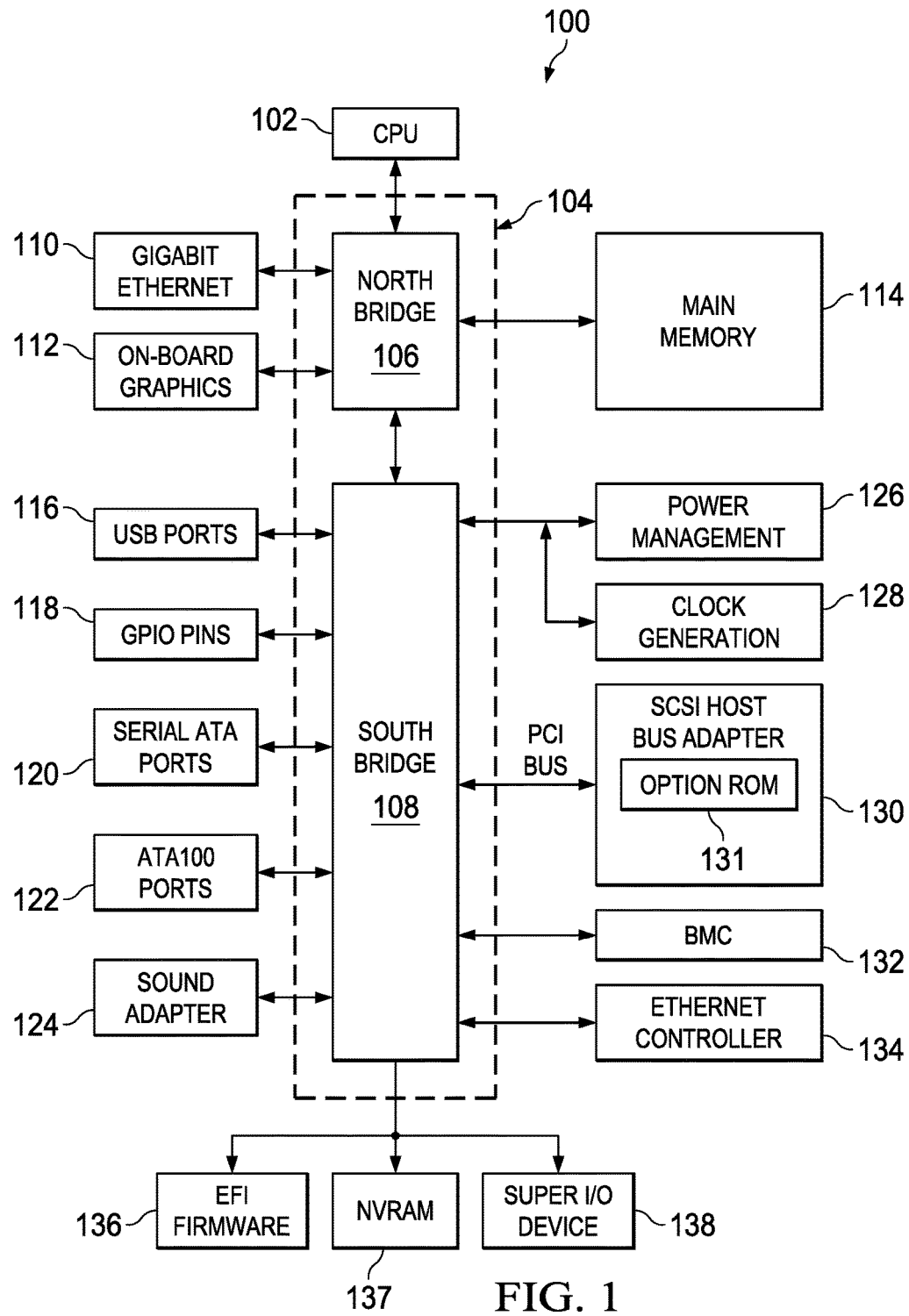
FIG. 1 is a block diagram of an example of an Information Handling System (IHS) configured to implement systems and methods described in various embodiments.

Systems and methods described herein provide automated system-level failure and recovery. Many of these systems and methods may be applicable to the development of software that includes error handling code and that involves two or more processes capable of communicating or otherwise exchanging data with one another.

The term "error handling code" refers to one or more portion(s) of a software application that is configured to: identify errors typically encountered during execution of the application, prevent those errors from occurring whenever possible, recover from failures when they occur (without terminating the software application), gracefully terminate the application, save error information to a log, etc.

A "process," also referred to as a "system component," carries out tasks within an Operating System (OS) executed by an Information Handling System (IHS). A software program is a set of machine code instructions and data stored in an executable image and is, as such, a passive entity; whereas a process can be thought of as a computer program in action. Each process a dynamic entity, changing as machine code instructions are executed by the IHS's Central Processing Unit (CPU). Typically, a process includes a program counter and CPU registers, as well as process stacks containing temporary data such as routine parameters, return addresses, and saved variables.

For example, Linux is a multiprocessing OS. Processes are separate tasks, each with their own rights and responsibilities. If one process crashes it should not cause another process in the system to crash. In many implementations, each individual process runs in its own virtual address space and is not capable of interacting with another process except through secure, kernel managed mechanisms.

Processes can exchange information or synchronize their operation through several methods of inter-process communication (IPC). The term IPC refers specifically to mechanisms (e.g., provided by an OS) or techniques that allow processes to share data amongst themselves. Typically, software applications that use IPC are categorized as clients or servers: the client requests data and the server responds to the client's request by providing the requested data. It should be noted that many applications and processes are both clients and servers.

When a program is executed, it may create several processes and each process may have several threads. Each process has a parent, that is, the one that started it. If the parent goes away, its child process then becomes a child of the initial process. Threads are different than processes because threads share the same virtual memory address space, but they have their own stack. It is much easier for two threads within the same process (as opposed to two independent processes) to share data between themselves because they do not have to use IPC; rather, they simply have to coordinate access with semaphores and mutexes (so that one thread is not changing data while the other is reading it).

As noted above, systems and methods described herein enable the testing of error handling code, and may ensure that all software failure conditions have been accounted for, including communications errors among various processes.

To illustrate some of the types of failures that may be handled by the error handling code tested using the systems and methods described herein, consider the following hypothetical scenario: "process A" is an IPC coordinator, such that all processes send IPC requests to Process A to route them to the correct receiving process. "Process B" is an IPC server and provides a service that clients can access. "Process C" is another IPC server that provides another service which itself consumes the service provided by Process B. Finally, "process D" is an IPC client that consumes the service provided by process C.

In this scenario, a hang occurs when any of processes A, B, C, or D stops processing requests. Similarly, a crash occurs if a process ceases to exist (from an OS point of view). These types of failures may be caused by a programming error or any other factor outside the process' control. Using systems and methods described herein, the portion of the error handling code that detects the hang or crash and/or takes appropriate action to remediate the failure (e.g., killing and restarting the affected process, node failover in high-availability (HA) system, reset/restart, etc.) may be tested.

In the same hypothetical scenario, a typical message path is: D→A→C→A→B (request), and then B→A→C→A→D (response). In this example, there are eight different traversals involved in the processing of each request, and messages may be lost or delayed beyond a given time limit during any of these traversals. Using systems and methods described herein, the portion of the error handling code that handles message loss and/or takes appropriate action to remediate that particular type of failure (ranging from re-transmitting only the failed message through to re-running the original request from scratch) may be tested.

Another failure may occur where one process is out of control and allocates all of the memory in the IHS, leaving none left for other processes to do execute. Using systems and methods described herein, the portion of the error handling code that handles out-of-memory failures may be tested. Incidentally, out-of-memory conditions may prompt cascading failures among other processes, which may also be tested.

Another failure may involve file system errors that may happen, for example, when storage is exhausted or flash becomes corrupt. This is a rare but real-world issue that is ordinarily very difficult to test. Yet, using systems and methods described herein, the portion of the error handling code that handles such file system errors may also be tested.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a CPU or hardware or software control logic, Read-Only Memory (ROM), and/or other types of nonvolatile memory.

Additional components of an IHS may include one or more disk drives, one or more network ports for communicating with external devices as well as various input/output (I/O) devices, such as a keyboard, a mouse, a touchscreen, and/or a video display. An IHS may also include one or more buses operable to transmit communications between the various hardware components. An example of an IHS is described in more detail below.

FIG. 1 shows an example of IHS 100 configured to implement systems and methods described herein. It should be appreciated that although certain embodiments described herein may be discussed in the context of a desktop or server computer, other embodiments may be utilized with virtually any type of IHS. In this example, the IHS is configured to provide automated system-level failure and recovery, as explained in more detail below.

Particularly, the IHS includes a baseboard or motherboard 100, which is a printed circuit board (PCB) to which components or devices are mounted to by way of a bus or other electrical communication path. For example, CPU 102 operates in conjunction with a chipset 104; CPU 102 is a processor or microprocessor that performs arithmetic and logical operations necessary for the functioning of the IHS.

Chipset 104 includes northbridge 106 and southbridge 108. Northbridge 106 provides an interface between CPU 102 and the remainder of the IHS. Northbridge 106 also provides an interface to main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the I/O operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during the operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an OS and application programs. An OS comprises a set of programs that control operations of the IHS and allocation of resources. An application program is software that runs on top of the OS and uses computer resources made available through the OS to perform application specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the EFI Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS. In some implementations, the systems and methods described herein may be used to test the resiliency and recover-ability of services running in BMC 132.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise any device that executes software with error handling capabilities, including embedded systems such as, for example, cable-top boxes, phones, media devices, game consoles, telephony equipment, traffic lights, automotive vehicles, avionics, factory controllers, etc. Each of these devices may have its own requirements for robustness and reliability, and may need to handle of errors that may occur during operation. It is also contemplated that an IHS may not include all of the components shown in FIG. 1, may include other components that are not explicitly shown, or may utilize a different architecture.

In some embodiments, a fault injection program, technique, and/or framework may inject faults into a system in multiple pre-determined ways, and it may then examine the system's states following the fault to verify that errors were handled as designed and recovery completes. For example, using systems and methods described herein, it is possible to inject faults such as message drop, out of order messages into an IPC messaging subsystem. It is also possible to inject faults to simulate crash or hang within a OS process. It is also possible to simulate OS errors and hardware faults. By utilizing a continuously running program, selected faults may be injected into selected locations to ensure full test coverage.

The criteria for target selection, fault selection, and frequency of injection are configurable input parameters. These parameters may specify certain targets, faults and frequencies or give ranges that are used to select random values. As such, a fault injection program, as described herein, may be configured to test inter-process dependencies at a system-level, in contrast with other frameworks that either work within an individual process or at a virtual machine level.

FIG. 2 is a flowchart of an example of method 200 for automated system-level failure and recovery, according to various embodiments. Particularly, method 200 defines a set of input parameters 201 that may include one or more of: a test procedure to run, a number of system components (n), a number of IPC brokers (b), a set of faults (f), and selection criteria (s). Input parameters 201 may be used to provide inputs into a fault injection program. In various embodiments, the fault injection program may take these inputs from a configuration file, command line arguments, or script.

Method 200 also defines a set of faults 202 that may include a crash or a hang (e.g., SIGKILL is a signal sent to a process to cause it to terminate immediately; SIGSEGV is a signal sent to a process when it makes an invalid memory reference or segmentation fault; SIGTERM is a generic signal used to cause program termination that can be blocked, handled, and/or ignored; and SIGSTOP is a signal that pauses that process in its current state). Set of faults 202 further includes message drops (e.g., IPC broker message or notification drop, out of order messages, queue overflows, etc.), OS failures (e.g., memory exhaustion, etc.), hardware (HW) application programming interface (API) failures (e.g., $I^2C$ read/write fail, I/O failures, bent pin, etc.), and/or destructive failures (e.g., flash corruption, etc.).

Method 200 also defines a set of selection criteria 203 that may include a type of failure (e.g., in node, cross node), a failure rate (e.g., time interval, count), process selection (e.g., targeted process names, top command based, child (fork) based, cross node (system, networkd, cluster infrastructure), cluster resources, and/or non-cluster resources)).

The test procedure to be executed may exercise one or more processes and provide a pass/fail output. This test procedure is continuously run while the fault injection program injects faults. Under normal operating conditions, it is expected that the test procedure should continue to run, despite the injection of faults. Otherwise, if test procedure is an external network test (e.g., testing of HTTP responses), then the process should either run successfully, or fail with a known error code and recover within a specified timeout.

As an illustrative, non-limiting example, assume that the subset of system components is N1={c1, c2}, and that the subset of IPC brokers is B1={b1}. Also, the subset of faults or types of faults to be inserted for each member of N1 includes F1=f(c1, f)={crash, hang}, which simulates crash and hang errors in c1, F2=f(c2, f)={hang, malloc failure}, which simulates hang errors and memory allocation (maloc) failures in c2, and F3=f(b1, f)={message drop}, which simulates a message drop by b1. Moreover, the subsets of selection criteria for each component per its corresponding fault is given by: S1=f(F1, s)={in node, ti=30 mins, c=20}, which simulates crash and hang faults within the node 20 times (that is, it repeats this fault for "20 counts"), one fault injection every 30 mins; S2=f(F2, s)={in node, malloc fault [ti=10 mins, c=100], hang [ti=60 mins]}, which simulates both: a malloc failure every 10 minutes that ends after 100 counts, and a hang error every 60 minutes for the life of c1; and S3=f(F3, s)={ti=90 secs, count=500}, which simulates a message drop every 90 seconds that ends after 500 counts.

Referring back to FIG. 2, method 200 begins at block 204. At block 205, method 200 defines its input parameters among the possible sets 201-203. In the foregoing hypothetical, for example, block 205 defines N1 as the subset of n={c1, c2}, B1 as the subset of brokers={b1}, F1 as faults for c1={crash, hang}, F2 as faults for c2={hang, malloc failures}, F3 as faults for b1={message drop}, S1 as the criteria for C1={in node, ti=30 mins, c=20}, S2 as the criteria for c2={in node, malloc fault [ti=10 ins, c=100], hang [ti=60 min]}, and S3 as the criteria for b1={ti=90 secs, count=500}.

At block 206, method 200 initializes the N1 and B1 components with the defined parameters. At block 207, method 200 starts a fault injection program that loads those parameters. Then, with reference to the hypothetical example, at block 208 method 200 starts timers for c1 and c2. First timer 209 is a 30-minute timer that stops after 20 counts. Each time first timer 209 is up, a KILL or STOP signal is sent to c1. Second timer 210 is a 60 minute timer. When second timer 210 is up, a STOP signal is sent to c2. Method 200 then ends at block 211.

Figure 3A:
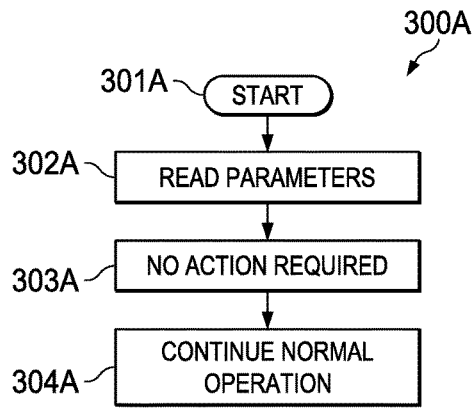
FIGS. 3A-C are flowcharts of examples of methods that illustrate how software processes behave when the method of FIG. 2 is executed according to various embodiments.
Figure 3B:
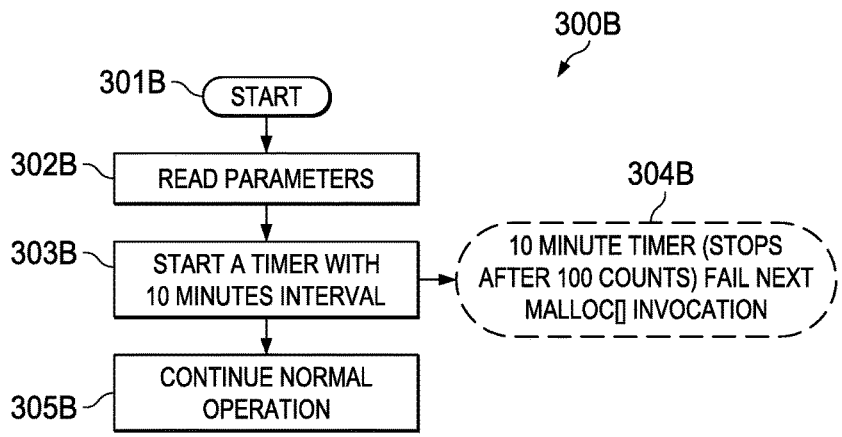
Figure 3C:
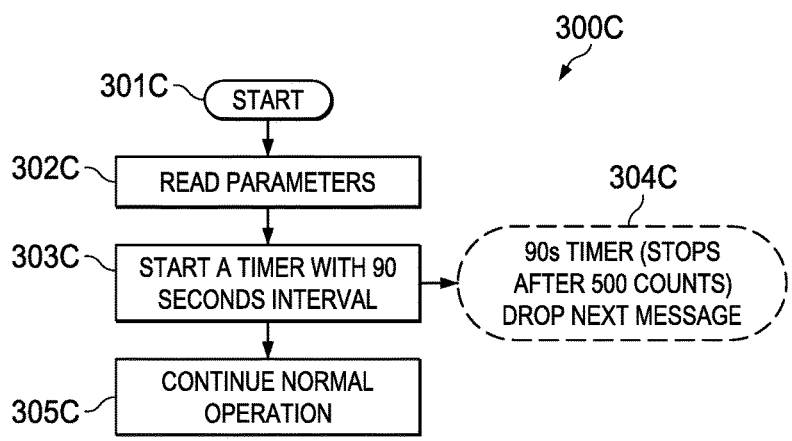

FIGS. 3A-C are flowcharts of examples of methods that illustrate how software processes behave when the method of FIG. 2 is executed, according to various embodiments. In line with the ongoing hypothetical scenario, FIG. 3A shows c1's control flow, FIG. 3B shows c2's control flow, and FIG. 3C shows b1's control flow. Specifically, flow 300A (corresponding to c1's behavior) starts at block 301A. At block 302A, method 300A reads input parameters. At block 303A, method 300A determines that no action is required. At block 304A, method 300A allows process c1 to continue its normal operation(s).

Flow 300B (corresponding to c2's behavior) starts at block 301B. At block 302B, method 300B reads input parameters. At block 303B, method 300B starts timer 304B, which is a 10-minute timer that injects malloc failures every time timer 304A is up, and stops after 100 counts (number of error injections). At block 305B, method 300B allows process c2 to continue its normal operation(s).

Flow 300C (corresponding to b1's behavior) starts at block 301C. At block 302C, method 300C reads input parameters. At block 303C, method 300C starts timer 304C with a 90-second duration which injects message drop failures each time timer 304C is up, and stops after 500 counts or error injections. At block 305C, method 300C allows process b1 to continue its normal operation(s).

Figure 4:
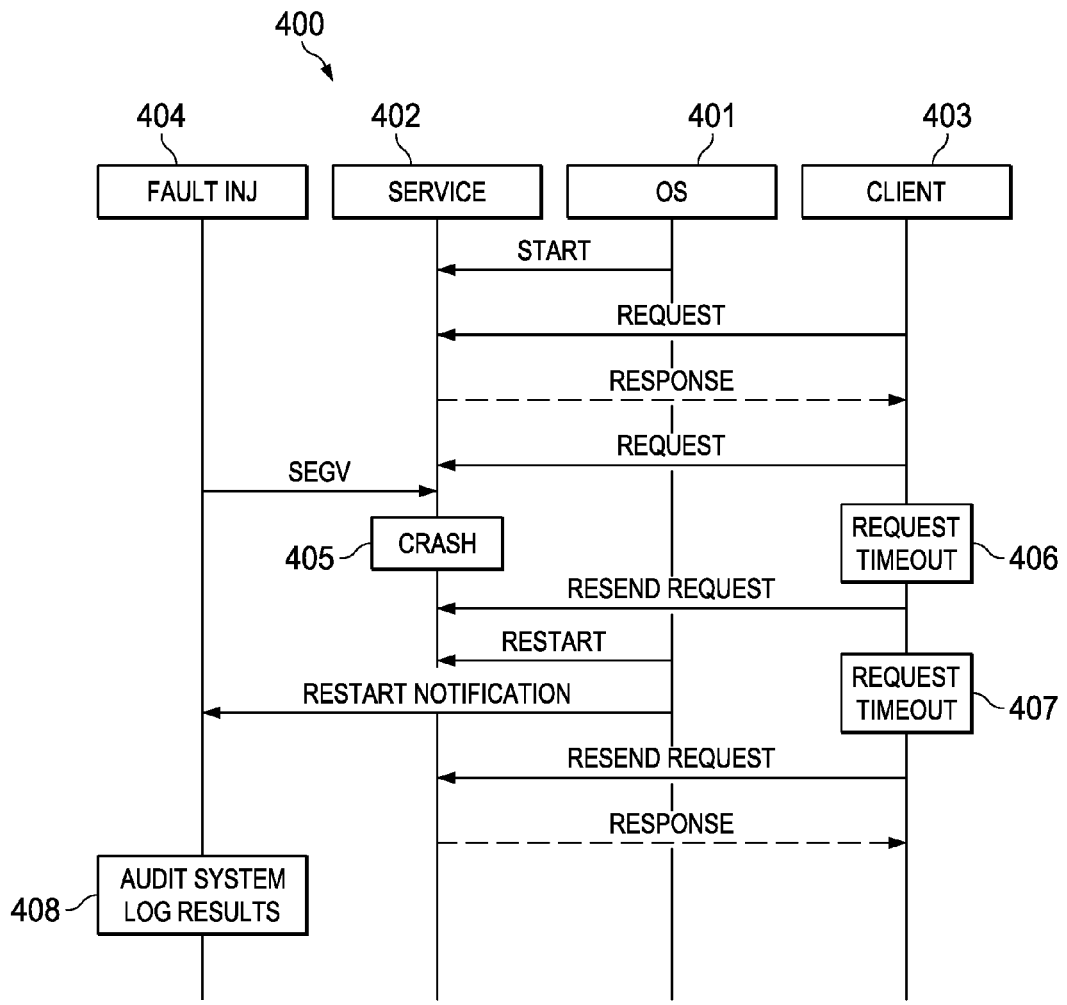
FIG. 4 is a flow diagram illustrating an example of a method for testing the recovery, by error handling code, of a crash that is simulated using a fault injection program according to various embodiments.

FIG. 4 is a flow diagram illustrating an example of a method for testing the recovery, by error handling code, of a crash that is forced or simulated using a fault injection program according to various embodiments. This example involves OS 401 (e.g., "b1"), service 402 (e.g., "c1"), client 403 (e.g., "c2"), and fault injection program 404. At the outset, OS 401 sends a start message to service 402. Once service 402 has started, client 403 sends a first request to service 402, through OS 401, which answers client 403's request with a first response, also through OS 401. Then, client 403 sends a second request to service 402 but, before service 402 can respond to the second request, fault injection program 404 sends a SEGV signal to service 402, which suffers a forced and/or simulated crash 405 as result.

Because service 402 crashes without responding to the second request, it causes request timeout 406 in client 403, which in turn causes client 403 to resend the second request to service 402 (which, in this example, is still crashed). In this case, it is only after the re-sent second request is transmitted that OS 401 causes service 402 to restart. As part of the restart procedure, OS 401 also sends a notification of the restarting of service 402 to fault injection program 404. Because the third request is not answered, it causes another request timeout 407. After the second request is again re-sent by client 403 to service 402 though OS 401, service 402 responds to the second request.

Finally, at block 408, fault injection program 404 logs results and/or audits the system. As such, method 400 tests the recovery of a crashed process and the retry of a request from a client program.

Figure 5:
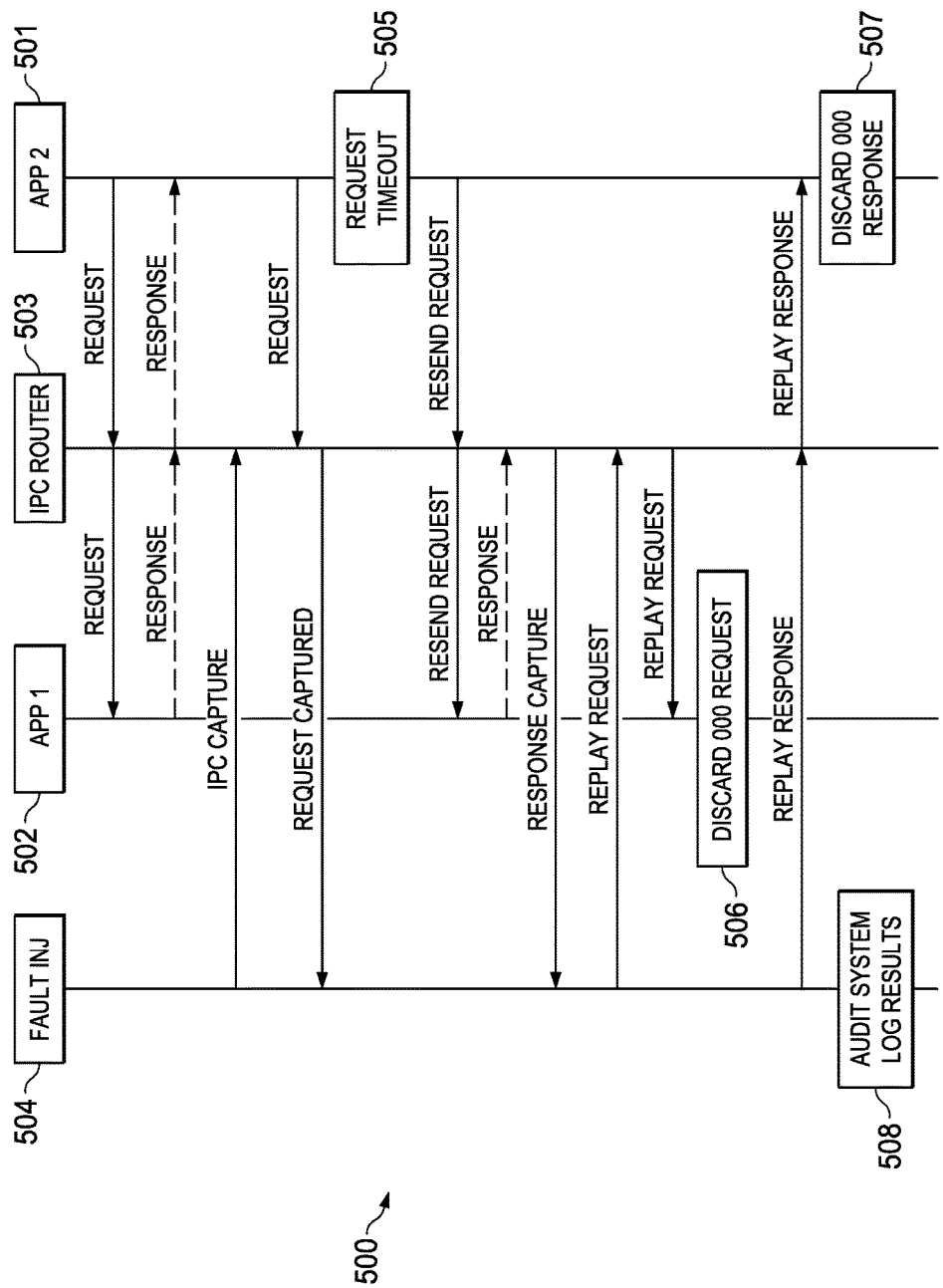
FIG. 5 is a flow diagram illustrating an example of a method for testing the detection, by error handling code, of out-of-order IPC messages that are simulated using a fault injection program according to various embodiments.

FIG. 5 is a flow diagram illustrating an example of a method for testing the detection, by error handling code, of out-of-order IPC messages that are forced or simulated using a fault injection program according to various embodiments. This example involves application or client process 501, application or server process 502, IPC router process 503, and fault injection program 504. At the start, process 501 sends a first request to IPC router 503, which then routes the first request to process 502. Process 502 sends a first response to IPC router 503, which in turn routes the first response back to process 501.

Then, fault injection program 504 sends an IPC capture signal to IPC router 503. As such, when IPC router 503 receives a second request from process 501, instead of routing it to its destination process 502, IPC 503 captures that second request and re-routes it to fault injection program 504. Because process 502 does not receive the second request, timeout 505 results.

As a consequence, the second request is re-sent from process 501 to process 502 through IPC router 503. Process 502 sends a response to IPC 503, but instead of forwarding that response to process 501, IPC 503 captures the response and re-routes it to fault injection program 504. Then, before another timeout occurs, fault injection program 504 sends a replay request signal to IPC router 503, which replays the latest request to service 502. Because process 502 has already responded to that request (although process 501 never received the intercepted response), the request is discarded as an out-of-order (OOO) request 506.

Thereafter and still before another timeout occurs, fault injection program 504 sends a replay response signal to IPC router 503, which then sends the response corresponding to the re-sent request to process 501. Similarly as with process 502, receipt of the replayed response causes the response to be discarded by process 501 as an OOO response 507.

Finally, at block 508, fault injection program 504 logs results and/or audits the system. As such, method 500 tests the ability of the system to recover from a failure due to messages being out-of-order.

In addition to providing a fault injection program, systems and methods described herein may involve interaction with certain system functions which may reside in user-space or within the O (e.g., IPC sockets, message queuing libraries, file I/O, memory and process management, etc.). Certain functions may be implemented as user mode libraries that can be modified to interact with the fault injection program. If the system under test implements a message queuing capability or if it has an abstraction layer over a message queuing library, that layer can be modified to accept requests from the fault injection program to drop, delay or reorder IPC messages. Other functions may be implemented as wrapper functions that embody the logic needed for fault injection and invoke system libraries as appropriate. For example a wrapper function may be created for the malloc function that can be configured by the fault injection program to fail selected calls to malloc. Moreover, certain operations performed or invoked by the fault injection program may include existing command line programs, such as kill—SIGSEGV.

In some cases, the systems and methods described herein may enable next-generation server development. A next-generation serve may contain an embedded chassis controller that can operate in a redundant cluster. It contains a large number of communicating processes that handle critical functions, including power and thermal management. Failure of these processes can have serious consequences to our customers, so it is essential that there be error handling and recovery logic for all possible failures at all possible points in the system. This, in turn, requires that the error handling logic be tested.

As such, systems and methods described herein carry out this testing of the error handling logic in an automated fashion, and in ways that cannot be otherwise be achieved. This produces better quality products for end-customers, which means fewer customer originated defects, reduced rework, etc.

Generally speaking, software that must operate over indefinite periods of time benefit from the fault injection framework described herein. Likewise, hosted cloud services and professional services can make use of the systems and methods described herein to ensure robust operation of those services.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
    a processor; and
    a memory coupled to the processor, the memory having program instructions stored thereon that, upon execution by the processor, cause the IHS to:
        execute a client component configured to participate in an inter-process communication (IPC) with a service component as coordinated by Operating System (OS) component;
        invoke a fault injection component configured to cause the service component to crash in the absence of fault; and
        determine that an error handling process successfully handles the crash in response to: (i) a request being sent by the client component to the service component through the OS component, (ii) the service component crashing in response to a command issued by the fault injection component, (iii) after a first timeout, the request being sent a second time by the client component to the service component through the OS component causing the service component to restart, (iv) the OS component notifying the fault injection component that the service component has restarted, and (v) after a second timeout expiring, the request being sent a third time by the client component to the service component through the OS component causing the service component to respond.

2. The IHS of claim 1, wherein the OS component includes an IPC broker.

3. The IHS of claim 1, wherein program instructions, upon execution, further cause the IHS to determine that the error handling process successfully handles the crash in response to the service component continuing to run despite the crash.

4. The IHS of claim 1, wherein the inter-process communication includes an external network test.

5. The IHS of claim 4, wherein the external network test involves testing Hypertext Transfer Protocol (HTTP) responses.

6. The IHS of claim 5, wherein program instructions, upon execution, further cause the IHS to determine that the error handling process successfully handles the crash in response to the service component failing with a known error code.

7. The IHS of claim 6, wherein program instructions, upon execution, further cause the IHS to determine that the error handling process successfully handles the crash in response to the service component recovering within a specified time period.

8. The IHS of claim 1, wherein program instructions stored thereon that, upon execution, further cause the IHS to:
    receive configuration parameters; and
    test inter-process dependencies using the configuration parameters.

9. The IHS of claim 8, wherein the configuration parameters are selected from the group consisting of: an identification of an IPC broker, an identification of one or more other processes configured to communicate with the IPC broker, a list of one or more faults, and selection criteria.

10. The IHS of claim 9, wherein the one or more faults further comprise: a crash, a hang, a malloc failure, a message drop, or an out-of-order message.

11. The IHS of claim 9, wherein the selection criteria further comprise:
    a first criterion indicating how often a particular fault is to be simulated; and
    a second criterion indicating for how long the particular fault is to be simulated.

12. A memory device having program instructions stored thereon that, upon execution by a processor of an Information Handling System (IHS), cause the IHS to:
    execute a broker process configured to participate in an inter-process communication (IPC) between a client component and a service component;
    invoke a fault injection component configured to cause an Out-of-Order (OOO) error in the absence of fault; and
    determine that an error handling process successfully handles the OOO error in response to: (i) the fault injection component issuing a capture command to the broker process, (ii) the broker process receiving a request issued by the client component to the service component, (iii) the broker process re-routing the request to the fault injection component, (iv) after a timeout expires, the client component sending a resend request command to the service component via the broker process, (v) the broker process receiving a response from the service component, (vi) the broker process re-routing the response to the fault injection component, (vii) the fault injection component issuing a replay request command to the broker process, (viii)

the broker process sending the replay request command to the service component, (ix) the service component discarding the replayed request; (x) the fault injection component sending a replay response command to the broker process, (xi) the broker process replaying the response to the client component, and (xii) the client component discarding the replayed response.

13. The memory device of claim 12, wherein the program instructions, upon execution, further cause the IHS to determine that the error handling process successfully handles the OOO error in response to the service process: (a) continuing to run despite the OOO error; or (b) failing with a known error code and recovering within a specified time period.

14. The memory device of claim 12, wherein the program instructions, upon execution, further cause the IHS to:
receive configuration parameters; and
test inter-process dependencies using the configuration parameters.

15. The memory device of claim 14, wherein the configuration parameters are selected from the group consisting of: an identification of an IPC broker, an identification of one or more other processes configured to communicate with the IPC broker, a list of one or more faults, and selection criteria.

16. The memory device of claim 15, wherein the one or more faults further comprise: a crash, a hang, a malloc failure, a message drop, or an out-of-order message.

17. The memory device of claim 15, wherein the selection criteria further comprise:
a first criterion indicating how often a particular fault is to be simulated; and
a second criterion indicating for how long the particular fault is to be simulated.

18. In an Information Handling System (IHS), a method comprising:
executing a broker process configured to coordinate an inter-process communication (IPC) between a client component and a service component;
invoking a fault injection component configured to cause the service component to crash in the absence of fault; and
determining that an error handling process successfully handles the crash in response to: (i) a request being sent by the client component to the service component through the OS component, (ii) the service component crashing in response to a command issued by the fault injection component, (iii) after a first timeout expiring, the request being sent a second time by the client component to the service component through the OS component causing the service component to restart, (v) the OS component notifying the fault injection component that the service component has restarted, (vi) after a second timeout expiring, the request being sent a third time by the client component to the service component through the OS component and causing the service component to respond.

19. The method of claim 18, wherein the error handling process successfully handles the crash in response to the service component: (a) continuing to run despite the crash; or (b) failing with a known error code and recovering within a specified time period.

20. The method of claim 18, further comprising:
receiving configuration parameters selected from the group consisting of: an identification of an IPC broker, an identification of one or more other processes configured to communicate with the IPC broker, a list of one or more faults, and selection criteria;
wherein the one or more faults include: a crash, a hang, a malloc failure, a message drop, or an out-of-order message; and
wherein the selection criteria include: (a) a first criterion indicating how often a particular fault is to be simulated and (b) a second criterion indicating for how long the particular fault is to be simulated.

* * * * *

Disclaimer

10,146,653 B2 - Michael Emery Brown, Austin, TX (US); Lee E. Ballard, Georgetown, TX (US); Stephen M. Cohoon, Austin, TX (US); Santosh Kumar Bidaralli, Round Rock, TX (US). AUTOMATED SYSTEM-LEVEL FAILURE AND RECOVERY. Patent dated December 4, 2018. Disclaimer filed May 22, 2024, by the assignee, Pilot Inc.

I hereby disclaim the following complete Claim 3 of said patent.

*(Official Gazette, July 8, 2025)*